C. KOPPENHEFFER.
Plow.

No. 201,786. Patented March 26, 1878.

WITNESSES:
W. W. Hollingsworth
Edw. W. Byrn

INVENTOR:
C. Koppenheffer
BY
ATTORNEYS.

UNITED STATES PATENT OFFICE.

CORNELIUS KOPPENHEFFER, OF HALIFAX, PENNSYLVANIA.

IMPROVEMENT IN PLOWS.

Specification forming part of Letters Patent No. 201,786, dated March 26, 1878; application filed January 31, 1878.

*To all whom it may concern:*

Be it known that I, CORNELIUS KOPPENHEFFER, of Halifax, in the county of Dauphin and State of Pennsylvania, have invented a new and Improved Plow; and I do hereby declare that the following is a full, clear, and exact description of the same, reference being had to the accompanying drawings, forming part of this specification, in which—

Figure 1:
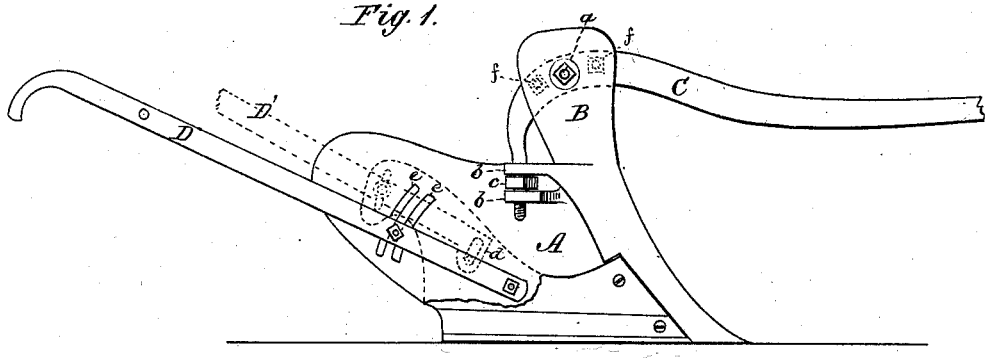
Figure 2:
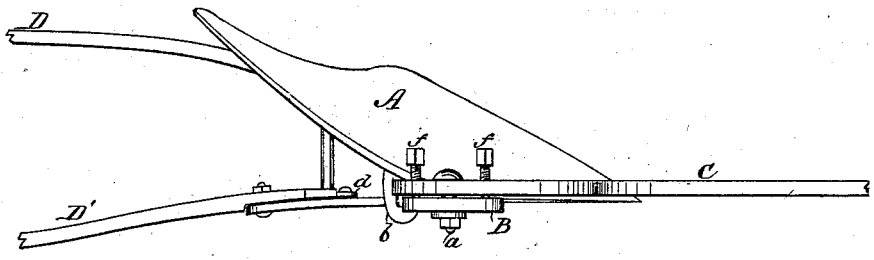

Figure 1 is a side elevation of the plow from the land-side, the land-side handle and bar being broken away and indicated in dotted lines. Fig. 2 is a plan view.

My invention relates to certain improvements in plows; and it consists, chiefly, in constructing the beam of iron and pivoting the same to an upward extension of the mold-board, while its rear end is reduced in size, screw-threaded, and bent around into a vertical position, so as to be secured between two lips on the mold-board by a nut screwed upon its end.

The invention also consists in the peculiar construction and arrangement of parts for adjusting the beam laterally, as hereinafter more fully described.

In the drawing A, represents a plow formed with an upward extension, B. C is the beam, made of iron, and pivoted by means of a bolt, $a$, to said extension. The rear part of the beam is reduced in size, bent downward into a vertical position, and fastened between lips $b\ b$ by means of a nut, $c$. These lips are cast upon the plow, and are provided with holes slightly larger than the end of the beam, so as to give sufficient room to permit the adjustment of the latter.

In adjusting the beam up or down, the nut is simply turned in one or the other direction between the lips, so as to cause the beam to move in a vertical plane upon its pivot-bolt $a$. For adjusting the beam laterally, however, two set-screws, $f\ f$, are provided upon each side of the pivot-bolt $a$, which screws pass through the beam and bear against the upward extension from the plow. Now, by loosening the pivot-bolt $a$ and tightening one of said set-screws and unscrewing the other, the beam may be adjusted to either the right or left, as desired, the enlarged holes in lips $b$ serving to accommodate the slight lateral movement of the rear end of the beam.

In adjustably fastening the handles D D' of the plow, the land-side handle D' is provided with a socket-plate, $d$, at its end, which plate is slotted transversely to the handle, and is fastened to the land-side by a bolt passing through the slot, while just above and to the rear of the same the land-side is extended and slotted, and a bolt employed to connect the handle therewith in a similar manner.

In connecting the mold-board handle D', it is bolted at its lower end to the mold-board, and the latter, at a point near its rear end, is cast with parallel ribs or bars $e\ e$, which are undercut to receive the head of a bolt and allow the same to be adjusted therein.

Having thus described my invention, what I claim as new is—

1. The iron plow-beam C, reduced, screw-threaded, and bent down at its rear end, and combined, by means of the bolt $a$ and nut $c$, with the plow having extension B and lips $b\ b$, substantially as shown and described.

2. In combination with the plow having extension B and slotted lips $b\ b$, the plow-beam pivoted to said extension, and bent down and inserted into the slots of said lips at the rear end, and having a fastening-nut, $c$, and adjusting-screws $f\ f$, substantially as and for the purpose described.

The above specification of my invention signed by me this 10th day of October, 1877.

CORNELIUS KOPPENHEFFER.

Witnesses:
SOLON C. KEMON,
CHAS. A. PETTIT.